US007768531B2

(12) United States Patent  
Ollmann

(10) Patent No.: US 7,768,531 B2
(45) Date of Patent: Aug. 3, 2010

(54) METHOD AND SYSTEM FOR FAST 90 DEGREE ROTATION OF ARRAYS

(75) Inventor: Ian R. Ollmann, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/414,634

(22) Filed: Mar. 30, 2009

(65) Prior Publication Data

US 2009/0189918 A1    Jul. 30, 2009

Related U.S. Application Data

(63) Continuation of application No. 10/928,450, filed on Aug. 27, 2004, now Pat. No. 7,511,722.

(51) Int. Cl.
*G09G 5/00*  (2006.01)
(52) U.S. Cl. .................... 345/619; 345/649; 345/659; 345/689
(58) Field of Classification Search ................ 345/619, 345/649, 659, 689
See application file for complete search history.

(56) References Cited

U.S. PATENT DOCUMENTS

| 4,667,190 A | 5/1987 | Fant |
| 4,914,605 A | 4/1990 | Loughmiller, Jr. et al. |
| 5,056,044 A | 10/1991 | Frederickson et al. |
| 5,414,781 A | 5/1995 | Spitz et al. |
| 5,583,956 A | 12/1996 | Aghajan et al. |
| 5,619,597 A | 4/1997 | Moreton |
| 5,670,982 A | 9/1997 | Zhao |
| 5,748,192 A | 5/1998 | Lindholm |
| 5,777,608 A | 7/1998 | Lipovski et al. |
| 6,011,566 A * | 1/2000 | Salamon ..................... 345/600 |
| 6,094,715 A | 7/2000 | Wilkinson et al. |
| 6,205,240 B1 | 3/2001 | Pietrzak et al. |
| 6,400,851 B1 | 6/2002 | Shih |
| 6,608,626 B2 | 8/2003 | Chan |
| 6,977,657 B2 | 12/2005 | Belley |
| 7,197,625 B1 * | 3/2007 | van Hook et al. ............. 712/2 |
| 7,236,649 B2 | 6/2007 | Fenney |
| 7,511,722 B1 * | 3/2009 | Ollmann ..................... 345/649 |
| 2005/0044123 A1 | 2/2005 | Sazegari et al. |

OTHER PUBLICATIONS

Eichenberger, Alexandre E. et al. "Vectorization for SIMD Architectures with Alignment Constraints," *PLDI '04: Proceedings of the ACM SIGPLAN 2004 Conference on Programming Language Design and Implementation*, Jun. 2004.
Naishlos, Dorit et al. "Vectorizing for a SIMD DSP Architecture," *Cases '03: Proceedings of the 2003 International Conference on Compilers, Architecture and Synthesis for Embedded Systems*, Oct. 2003.

* cited by examiner

*Primary Examiner*—Javid A Amini
(74) *Attorney, Agent, or Firm*—Blakely, Sokoloff, Taylor & Zafman LLP

(57) ABSTRACT

A method and system to rotate a $2^N$ by $2^N$ array are described. Consistent with one embodiment of the present invention, the $2^N$ elements of the $2^N$ rows of a $2^N$ by $2^N$ array are loaded from memory into the vector registers of a processor's single instruction multiple data (SIMD) unit. Next, the elements of the rows in the top half of the array are interleaved with corresponding elements from a corresponding row in the bottom half of the array. The loading and interleaving operations are repeated N times before the results, stored in the vector registers, are written back to memory.

46 Claims, 8 Drawing Sheets

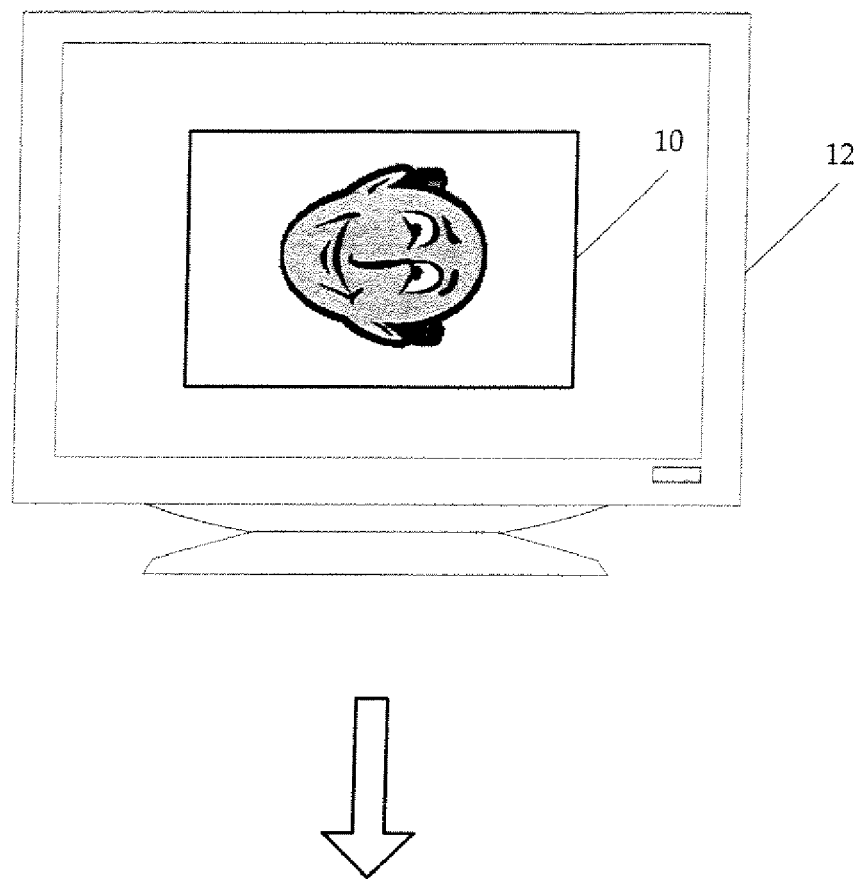
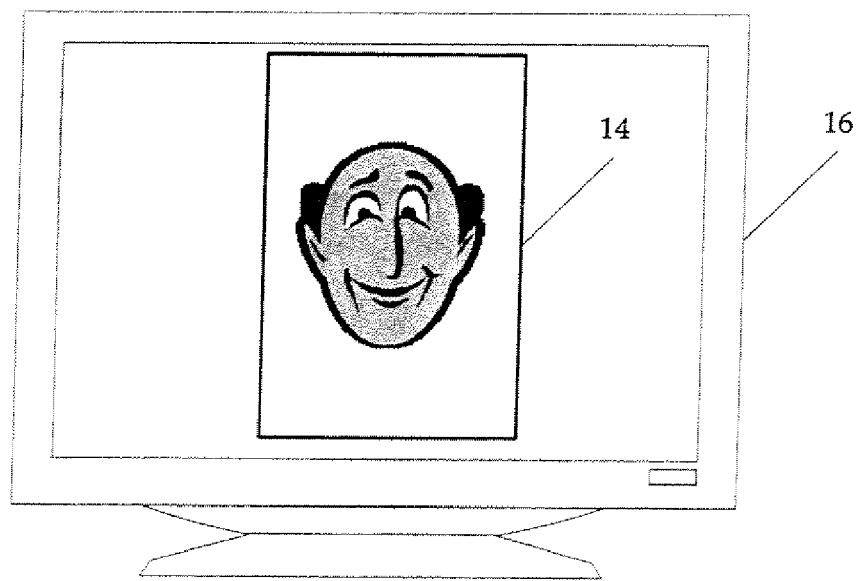
FIG. 1

(90 DEGREE COUNTER-CLOCKWISE ROTATION)

(90 DEGREE CLOCKWISE ROTATION)

FIG. 4 (COUNTER-CLOCKWISE ROTATION)

FIG. 5 (CLOCKWISE ROTATION)

METHOD AND SYSTEM FOR FAST 90 DEGREE ROTATION OF ARRAYS

This application is a continuation of U.S. patent application Ser. No. 10/928,450 filed on Aug. 27, 2004, now U.S. Pat. No. 7,511,722.

FIELD OF THE INVENTION

The present invention relates generally to data processing, and in particular, to a method and system to rotate a $2^N$ by $2^N$ array by 90°.

BACKGROUND OF THE INVENTION

A two-dimensional array, or matrix, is a data structure that is frequently used in computing to store various data objects. For example, digital pictures are generally stored in memory as two-dimensional arrays, each element of the array representing a pixel having coordinates corresponding to a particular column and row. It is not uncommon that an array needs to be rotated clockwise, or counter-clockwise, by 90°. For example, a digital photograph taken in portrait format may need to be rotated by 90° in order for it to be properly displayed. Many portable data devices, such as personal digital assistants, mobile phones, and global positioning systems, are designed with displays that can be viewed in both portrait and landscape orientations. Consequently, it is necessary for these devices to be able to quickly and efficiently rotate the display matrix as a user switches between portrait and landscape orientations.

Traditionally, rotating an array has been accomplished via a brute force of copying the array, element by element, to a new memory locations. For example, in the case of a digital image, the bits representing the color for each pixel (i.e., pixel data) are individually read from memory and written to a temporary buffer. Then, a target memory location for the rotated image is determined for the pixel data stored in the temporary buffer. Finally, the pixel data stored in the temporary buffer is copied to the target memory location. Once the pixel data for each pixel in the image has been read, temporarily stored, and then written to the target location, the rotated image is ready to be displayed.

The problem with this traditional approach is that it is costly in terms of processor and memory resources. For example, using the traditional approach to rotate an N×N array, $N^2$ load operations and $N^2$ store operations are required, resulting in $2N^2$ total operations. Consequently, a more efficient method of rotating arrays is desirable.

SUMMARY OF THE DESCRIPTION

A method for rotating a $2^N$ by $2^N$ array by 90° is provided. Consistent with one embodiment of the invention, to rotate a $2^N$ by $2^N$ array 90°, the elements of the array are first loaded into the vector registers of a processor's single instruction multiple data (SIMD) unit. Next, the vectors are merged so that the elements of each row in the top half of the array are interleaved with the elements of a corresponding row in the bottom half of the array. To rotate the array by 90° in the counter-clockwise direction, the elements are interleaved so that each element from a row in the top half of the array precedes an element from a row in the bottom half of the array. The interleaving operation is performed iteratively a total of N times, each iteration producing an array that is twice as wide and half as high as the original. After N interleaving operations, the resulting array is a single row in height having $2^{2N}$ columns. Finally, in what amounts to a computationally free operations the single row array is converted back into a two-dimensional array by dividing the single row into $2^N$ rows having $2^N$ elements and stacking the $2^N$ rows so that the last $2^N$ elements in the single row become the top row of the two-dimensional array and the first $2^N$ elements in the single row become the bottom row of the two-dimensional array.

BRIEF DESCRIPTION OF THE DRAWINGS

The present invention is illustrated by way of example and not limitation in the figures of the accompanying drawings, in which like references indicate similar elements and in which:

FIG. 1 illustrates a digital image on a display before and after the image has been rotated 90° using a method consistent with one embodiment of the present invention;

DETAILED DESCRIPTION

Figure 2:
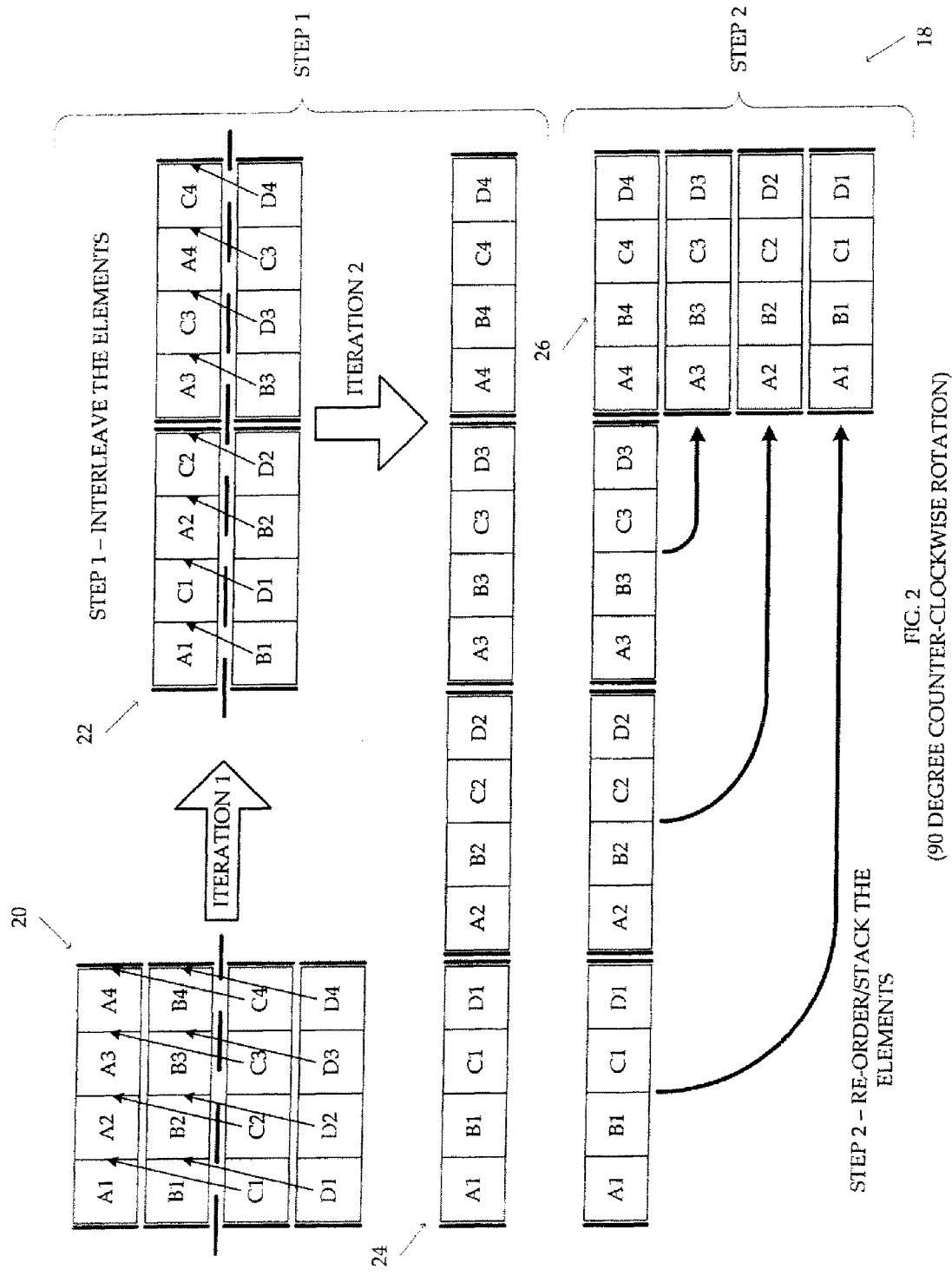
FIG. 2 illustrates a method, according to one embodiment of the invention, for rotating a $2^N$ by $2^N$ array 90° in the counter-clockwise direction.

The subject invention will be described with reference to numerous details set forth below, and the accompanying drawings will illustrate the invention. The following description and drawings are illustrative of the invention and are not to be construed as limiting the invention. Numerous specific details are described to provide a thorough understanding of the present invention. However, in certain instances, well-known or conventional details are not described in order to avoid unnecessarily obscuring the present invention in detail. Furthermore, in the drawings, the same element is labeled with the same reference numeral.

One embodiment of the present invention provides a computer-implemented method for rotating a $2^N$ by $2^N$ array by 90°. One advantage of the present invention is that it is more efficient, in terms of utilizing computing resources, than prior methods. In particular, the present invention provides a computer-implemented method for rotating $2^N$ by $2^N$ arrays that is less taxing on the central processing unit and requires fewer "load" and "store" operations than prior methods. For example, the brute force method of rotating an array, in which the array is copied to a new memory location element by element, requires 2N load and 2N store operations for a total $2N^2$ operations. In contrast, as will be described below, the present invention requires N load N store operations in addition to $N(\log_2(N))$ merge operations for a total of $N(\log_2(N))+$ 2) operations. Consequently, when 2N is greater than $\log_2(N)+2$, the method of the present invention is more efficient. Furthermore, the above constraint is true for all values of N greater than 1, so generally, the present invention is more efficient than the brute force method.

Although the present invention has many practical applications, one particularly useful application of the present invention is rotating digital images, such as digital photographs, for proper display on a monitor or other display. Accordingly, FIG. 1 illustrates a digital image of a man's face before 10, and after 14, it has been rotated by 90° in the counter-clockwise direction in accordance with one embodiment of the present invention. As illustrated in FIG. 1, the digital image 10 of the man's face on the display 12 is not properly oriented with respect to the layout of the photograph, and the display 12. For example, the digital image 10 should be displayed with a portrait layout so that the face is vertical with respect to the display 12, but is instead being displayed on display 12 in a landscape layout. As illustrated in display 16, by rotating the digital image 14 of the man's face 90° in the counter-clockwise direction, the digital image is oriented properly with respect to the display 16.

For one embodiment of the invention, the $2^N$ by $2^N$ array that is rotated may represent a subsection of a larger array. For example, a digital image may be divided into subsections, each subsection having $2^N$ by $2^N$ pixels. To rotate the entire digital image, each subsection is individually rotated and written to the proper memory location.

Although the present invention is described in the context of rotating a digital image, the present invention may have many other practical applications beyond rotating digital images. For example, any problem involving the rotation of data by 90° may benefit from the present invention. As most computer memory is organized for storing data in one dimension, the present invention is particularly useful for rotating multi-dimensional data structures stored in a one, or higher, dimensional storage medium.

FIG. 2 illustrates a method 18, according to one embodiment of the invention, for rotating a $2^N$ by $2^N$ array 90° in the counter-clockwise direction. As illustrated in FIG. 2, the original array 20, with N equal to 2, consists of sixteen elements arranged in four rows and four columns. Each element of the original array 20 is identified by a label indicating the position of the element within the array 20. For example, the element in the upper left most corner of the array 20 has the label "A1" indicating that the element is in row "A" and column "1" of the array 20.

According to one embodiment of the present invention, a $2^N$ by $2^N$ array is rotated in two steps. As illustrated in FIG. 2, the first step involves iteratively interleaving the elements of rows in the top half of the array 20 with the elements of corresponding rows in the bottom half of the array until the array is a single row high. For a $2^N$ by $2^N$ array, N interleaving operations are required. The second step involves dividing up the single row array 22 into individual rows, and stacking the rows in a manner that generates a rotated version of the original array 20.

For example, for one embodiment of the present invention, the first step involves iteratively interleaving the elements of each row of the original array 20. During the first iteration, the array 20 is divided in half by separating the rows of the top half of the array 20 from the rows of the bottom half of the array 20. Next, the elements of the top row of the top half of the array (i.e., row "A") are interleaved with the elements of the top row of the bottom half of the array (i.e., row "C"). For example, as illustrated in FIG. 2, the elements of row "A" are interleaved with the elements of row "C" such that an element from row "C" follows each element from row "A." Similarly, the elements of row "B" are interleaved with the elements of row "D" resulting in an intermediate array 22 that is twice as wide and half as high as the original array 20.

During the next iteration, the intermediate array 22 is again divided in half by separating the rows in the top half of the array 22 from the rows in the bottom half. As illustrated in FIG. 2, after the first iteration of interleaving, the intermediate array 22 has only two rows. Therefore, the elements from the top row are interleaved with the elements from the bottom row such that each element from the top row is followed by an element of the bottom row. For example, after the second interleaving operation, element "B1" from the bottom row follows element "A1" from the top row, and element "D1" from the bottom row follows element "C1" from the top row. The result of the second iteration of the interleaving operation is a single row array 24, beginning with the elements "A1," "B1," "C1," and "D1," and ending with the elements "A4," "B4," "C4," and "D4."

The second step involves dividing the single row array 24 into individual rows and stacking the individual rows in order so that the final array 28 represents a rotated version of the original array 20. For example, the single row array 24 is first divided into $2^N$ individual rows with $2^N$ elements in each row. In the particular example illustrated in FIG. 2, the single row is divided into four individual rows, each with four elements. Next, the four rows are stacked in a manner that results in a rotated version of the original array 20. In this case, the last individual row of the single row array 24 becomes the top row of the rotated array 26. The second to last row of the single row array 24 becomes the second row of the rotated array 26, and the third to last row becomes the third row of the rotated array 26. Finally the very first individual row of the single row array, with elements "A1," "B1," "C1," and "D1," becomes the bottom row of the rotated array 26. The result is an array 26 that has been rotated 90° in the counter-clockwise direction.

For one embodiment of the present invention, this second step may be considered a computationally free step because it simply involves writing the individual rows of the single row array to memory in the proper order. For example, as will be described in greater detail below, for one embodiment of the present invention, this second step is simply a matter of copying the contents of multiple vector registers to memory, so that the elements of the array are written to memory in the proper order. For one embodiment of the invention, the proper order means that the elements are written to memory in increasing order from left to right by column, and then row, so that the first memory location contains the first element of the first row of the array, and the second memory location contains the second element (e.g., the element in column 2) of the first row of the array, and so on, until the final memory location contains the last element (e.g., the element in the last column) of the last, or bottom, row of the array.

The particular example illustrated in FIG. 2 involves a four by four, for example, a $2^N$ by $2^N$ array with N being equal. Consequently the first step requires two (e.g., N=2) iterations of interleaving operations to achieve the single row array illustrated in FIG. 2 with reference numeral 22. It will be appreciated that the present invention is not limited to a four by four array, but instead, the present invention is equally applicable to $2^N$ by $2^N$ arrays having a value of N greater than two. For example, with N equal to three, an eight by eight array can be rotated with three iterations of interleaving operations.

Figure 3:
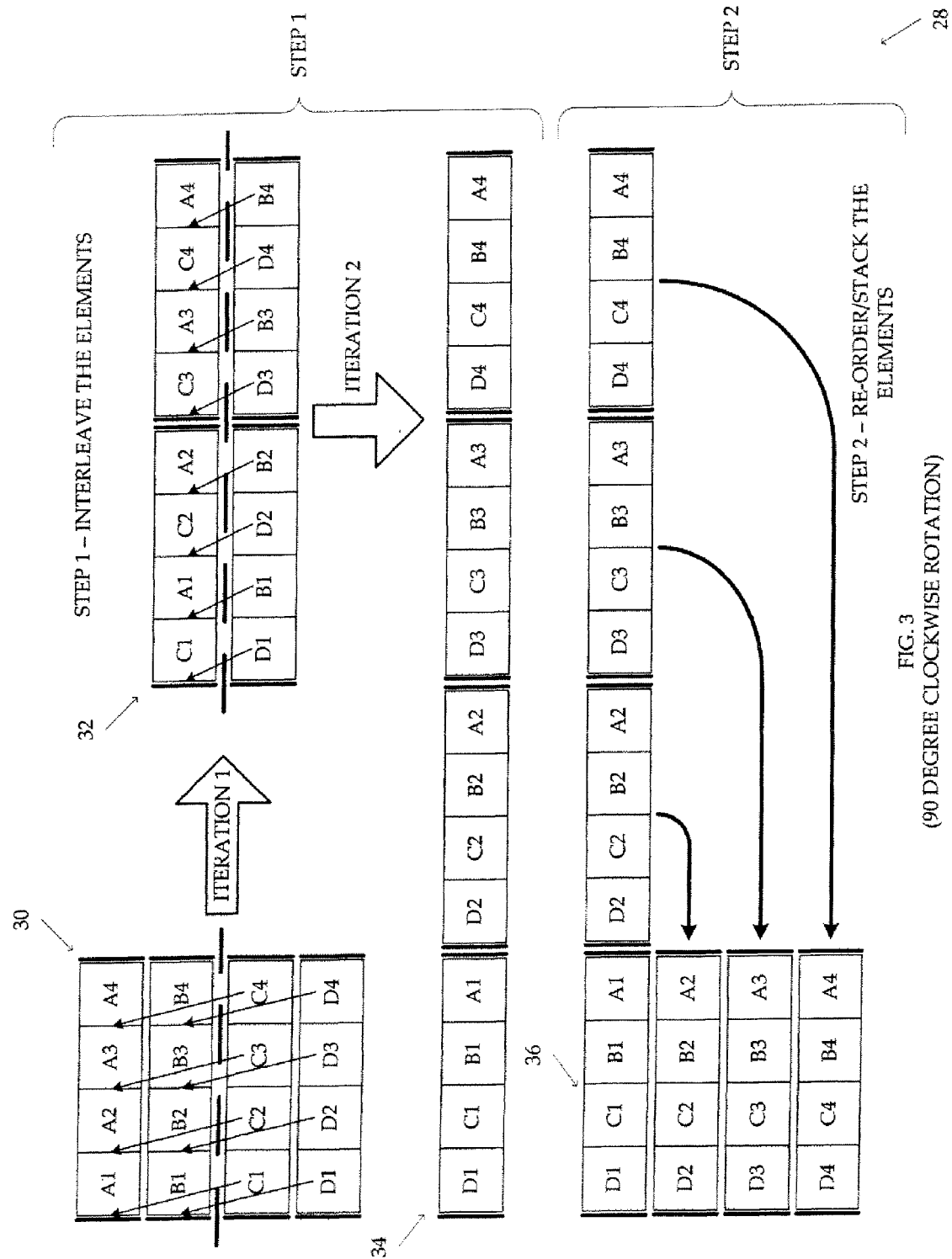
FIG. 3 illustrates a method, for one embodiment of the invention, for rotating a $2^N$ by $2^N$ array 90° in the clockwise direction.

FIG. 3 illustrates a method, consistent with one embodiment of the invention, for rotating a $2^N$ by $2^N$ array 90° in the clockwise direction. Similar to the method illustrated in FIG. 2, the method illustrated in FIG. 3 generally involves two steps. As will be described below, the differences between the counterclockwise method 18 of rotation illustrated in FIG. 2, and the clockwise method 28 of rotation illustrated in FIG. 3 is the order in which the elements are interleaved in step 1, and the order in which the elements are stacked in step 2.

Again, the first step involves interleaving the elements of the rows from the top half of the original array 30 with the elements of corresponding rows of the bottom half of the array 30, until the resulting intermediate array 34 is a single row with $2^N$ columns, or elements. However, to rotate the original array 30 in the clockwise direction by 90°, the elements from the rows in the top half of the array are preceded by elements from the bottom rows during the interleaving operations. For example, as illustrated in FIG. 31 during the first iteration of the interleaving operation, the top row of the top half of the original array 20 (i.e., row "A") is interleaved with the top row of the bottom half of the original array 30 (i.e., row "C"). However, in contrast to the counterclockwise method of rotation, elements from rows in the top half of the array are preceded by corresponding elements from the bottom rows. For example, after the first iteration, in the resulting intermediate array 32, element "C1," from the bottom row precedes element "A1" from the top row, and element "D1" precedes element "B1."

During the second iteration of the interleaving operation, elements from the top row of the intermediate array 32 are interleaved with elements from the bottom row of the intermediate array 32. Once again, the interleaving operation is performed such that elements from rows in the top half of the array are preceded by corresponding elements from the rows in the bottom half of the array. For example, as illustrated in FIG. 3, element "C1" from the top row of the intermediate array 32 is preceded by element "D1" from the bottom row of the intermediate array 32. The result of the second iteration of the interleaving operation is the sixteen-element wide single row array with reference numeral 34.

Similar to the method described with reference to FIG. 2, the second step involves dividing the single row array 34 into individual rows and stacking the rows in order so that the final array 26 represents a version of the original array 30 that has been rotated by 90° in the clockwise direction. However, after dividing the single row array 34 into four rows, each having four elements, the four rows are stacked in the reverse order as that of the method illustrated in FIG. 2. For example, as illustrated in FIG. 3, the first individual row of the single row array 34 becomes the top row of the rotated array 36. The second row of the single row array 34 becomes the second row of the rotated array 36, and the third row of the single row array 34 becomes the third row of the rotated array 36. Finally, the very last row of the single row array 34, with elements "D4," "C4," "B4," and "A4," becomes the bottom row of the rotated array 36. The result is an array 36 that has been rotated 90° in the clockwise direction.

Figure 4:
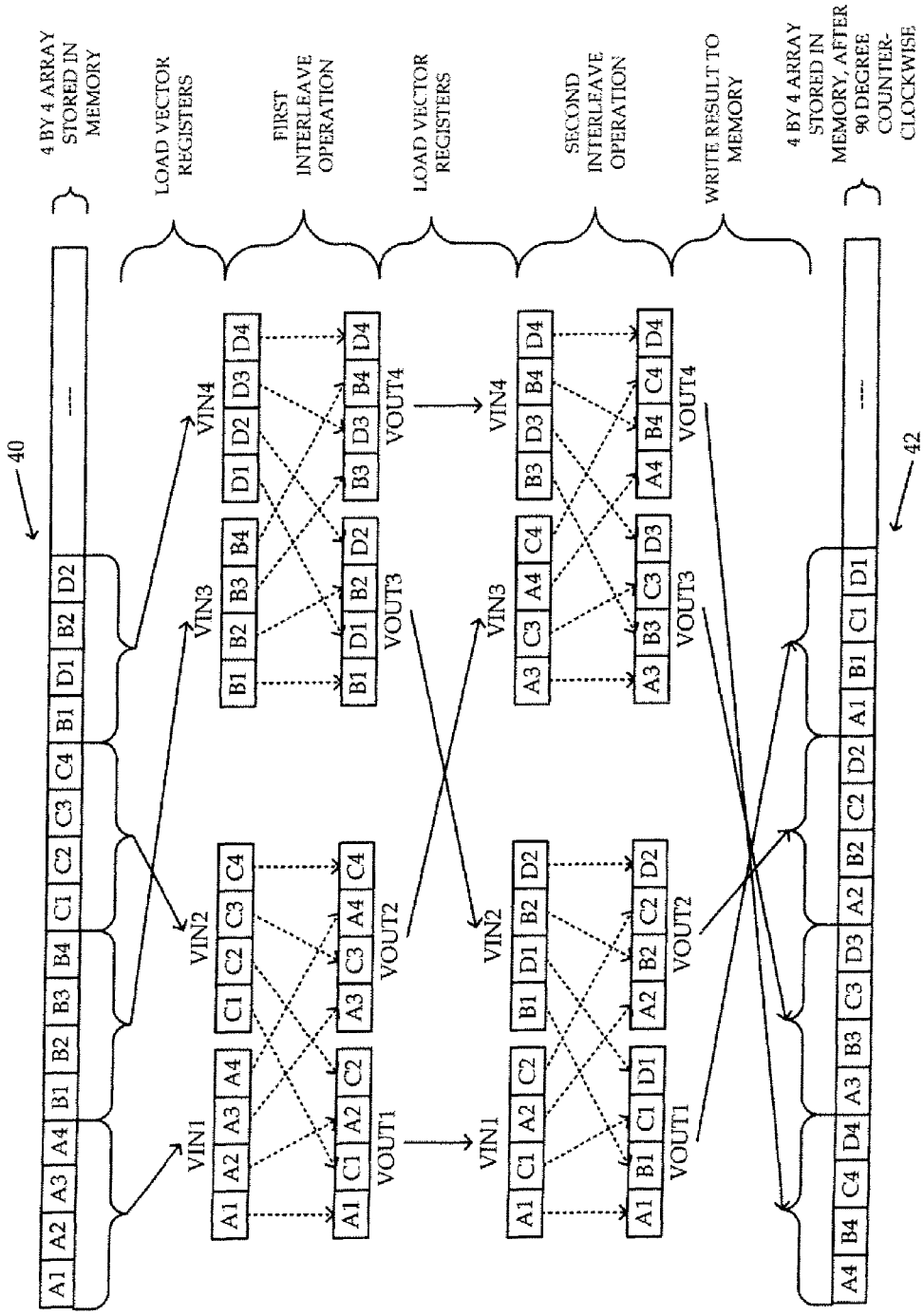
FIG. 4 illustrates from a vector register perspective, a method for rotating a $2^N$ by $2^N$ array 90° in the counter-clockwise direction, according to one embodiment of the present invention.
Figure 5:
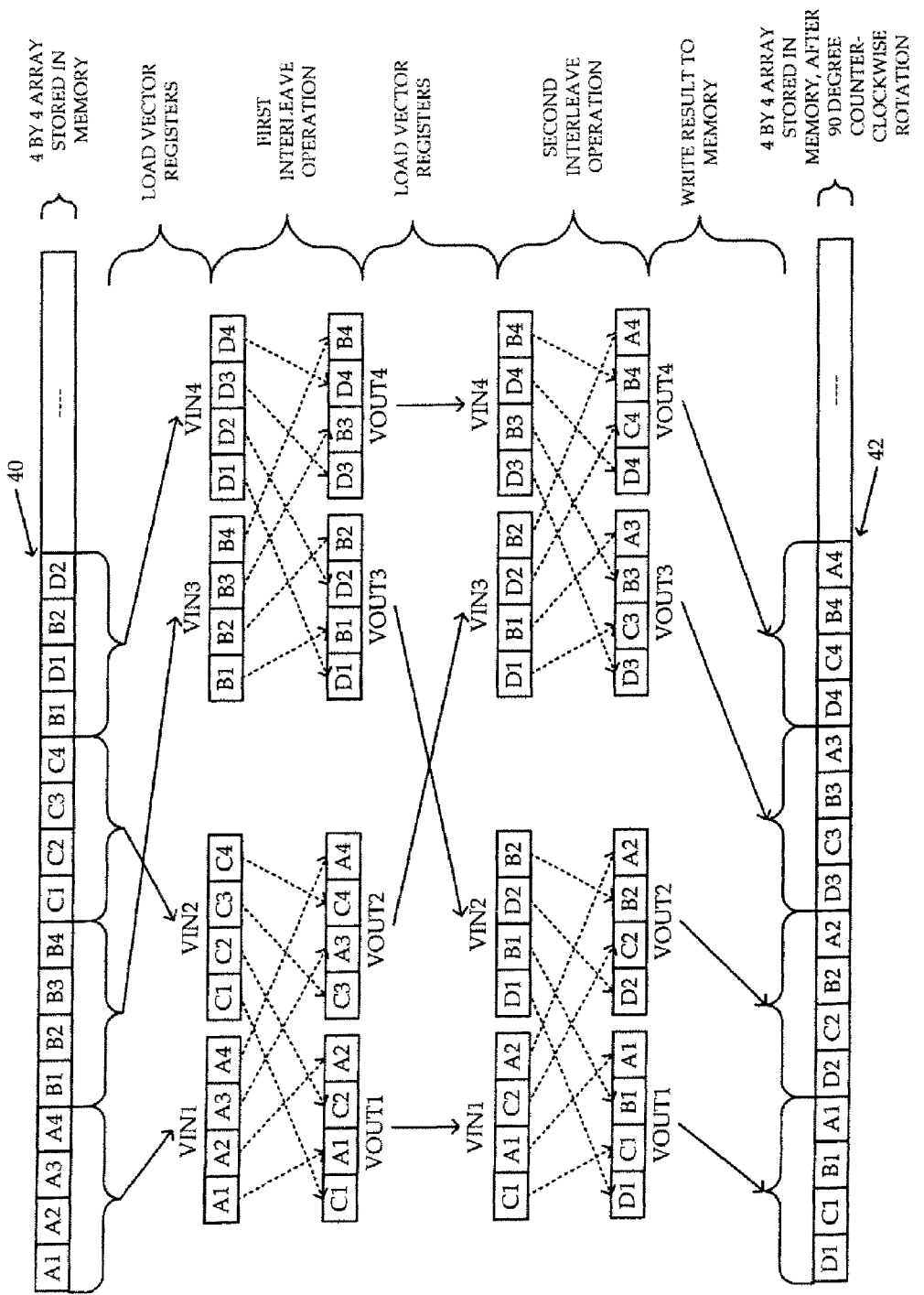
FIG. 5 illustrates from a vector register perspective, a method for rotating a $2^N$ by $2^N$ array 90° in the clockwise direction, according to one embodiment of the present invention.

FIGS. 4 and 5 illustrate one embodiment of the present invention, showing how the present invention might be implemented using vector registers of a single instruction multiple data (SIMD) unit of a microprocessor to rotate a $2^N$ by $2^N$ array 90° in the counter-clockwise and clockwise directions respectively. In particular, FIG. 4 illustrates from a vector register perspective, a method for rotating a $2^N$ by $2^N$ array 90° in the counter-clockwise direction. In FIG. 4, the top row, with reference numeral 40, represents a $2^N$ by $2^N$ array, with N equal to 2, stored in consecutive memory addresses of a memory device. Similarly, the bottom row with reference numeral 42, represents the same array stored in the same memory device after the array has been rotated counterclockwise by 90°.

Each element of the four by four array may represent different data objects, for example, such as pixel data for a particular pixel of a digital image. Accordingly, in a 32-bit system, where each pixel is stored in 4 bytes (i.e., 32 bits) of memory each labeled element may represent a 32-bit pixel value. However, it will be appreciated that each labeled element may represent a different number of bytes, depending on the hardware used to implement the present invention, and the nature of the particular data object the array represents.

In FIG. 4, each of the rows labeled "VIN1," "VIN2," "VIN3," "VIN4," "VOUT1," "VOUT2," "VOUT3," and "VOUT4" represent vector registers of a SIMD unit of a microprocessor. For example, the row labeled "VIN1" may be a vector register capable of storing and operating on four 32-bit elements of an array. Accordingly, each vector register in FIG. 4 is capable of storing four 32-bit pixel values of a digital image.

For one embodiment of the invention, a processor with a SIMD unit receives a vector merge instruction directing the processor to interleave elements from rows in the top half of the array with elements from rows in the bottom half of the array. As illustrated in FIG. 4, in response to the vector merge instruction, the processor loads the vector registers "VIN1," "VIN2," "VIN3" and "VIN4" with the data, representing the array, stored in memory. As a result, row "A" of the array is loaded into vector register "VIN1," while row "C" of the array is loaded into vector register "VIN2." Similarly, row "B" of the original array is loaded into "VIN3," and row "D" of the original array is loaded into "VIN4." Next, the SIMD unit interleaves the elements of the array by copying different bits of the input vector registers "VIN1," "VIN2," "VIN3" and "VIN4" to specific bits of the output vector registers "VOUT1," "VOUT2," "VOUT3," and "VOUT4."

For one embodiment of the invention, the interleave operation is performed in parallel so that all rows of the array are interleaved during a single clock cycle. For example, for one embodiment, all rows are loaded, and all rows are interleaved in unison during the same clock cycle, or series of clock cycles. In an alternative embodiment of the invention, the rows of the array are interleaved over multiple clock cycles. For example, for one embodiment of the invention, during a first clock cycle, the high order bits of the vector register storing the elements "A1," "A2," "C1," and "C2" are interleaved and the result written to "VOUT1," and during a second clock cycle, the elements stored in the lower order bits of the vector registers are interleaved and copied to the output vector registers.

For one embodiment of the invention, after the first interleave operation the results are loaded from the output vector registers into input vector registers, "VIN1," "VIN2," "VIN3", and "VIN4" to prepare for the second interleave operation. For example, as illustrated in FIG. 4, the contents of "VOUT1" are loaded into "VIN1," while the contents of "VOUT2" are loaded into "VIN3." Similarly, the contents of "VOUT3" are loaded into "VIN2," while the contents of "VOUT4" are loaded into "VIN4."

Next, during the second interleave operation, the contents of the vector registers representing the different elements of the array are again interleaved. As illustrated in FIG. 4, the elements stored in the input vector registers are copied to the output vector registers in a manner that interleaves the elements so that each element from a row in the top half of the array precedes an element from a row in the bottom half of the array.

Once the elements have been interleaved a second time, the contents of the output vector registers are written to memory so that the elements are in an order that is consistent with the original array, rotated by 90° in the counter-clockwise direction. In the example illustrated in FIG. 4, the contents of vector register "VOUT4" are written to the first memory location of the memory device 42, followed by the contents of "VOUT3," "VOUT2," and finally "VOUT1." The end result is a version of the original array, rotated by 90° in the counter-clockwise direction, stored in memory and ready for display.

FIG. 5 illustrates from a vector register perspective, a method for rotating a $2^N$ by $2^N$ array 90° in the clockwise direction, according to one embodiment of the present invention. The method illustrated in FIG. 5 differs from that of FIG. 4 only in that the interleaving operation is performed such that elements from the rows in the top half of the array are preceded by elements from corresponding rows in the bottom half of the array. For example, after the first interleave operation, "VOUT1" contains elements "C1" followed by "A1" followed by "C2" and then "A2." Accordingly, each element from the top row, for example row "A," is preceded by an element from a row in the bottom half of the array for example, row "C."

In addition, the clockwise rotation method illustrated in FIG. 5 differs from counter-clockwise rotation method of FIG. 4 in that the vector registers storing the results of the second interleave operation are written to memory in a different order. For example, the vector register "VOUT1" contains the top row of the rotated array and is therefore written to a memory location that precedes the second row of the array, which is stored in vector register "VOUT2." Finally, the third and fourth rows of the rotated array, stored in vector registers "VOUT3" and "VOUT4" respectively, are written to memory locations following the first two rows.

Figure 6:
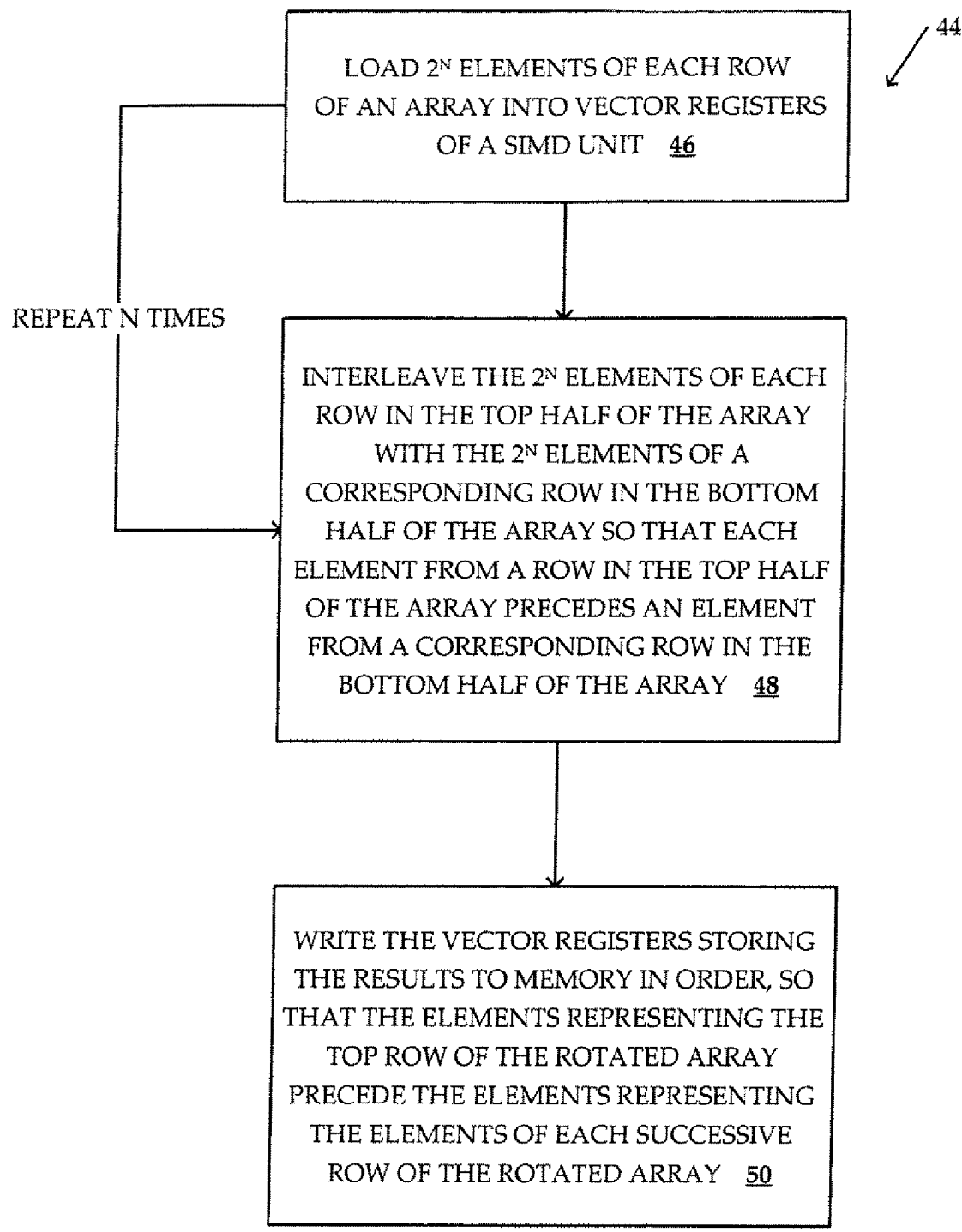
FIG. 6 illustrates a flowchart showing the operations, for one embodiment of the invention, required to rotate an array 90° in the counter-clockwise direction.

FIG. 6 illustrates a flowchart showing the operations 44, for one embodiment of the invention, required to rotate an array 90° in the counter-clockwise direction. According to the embodiment of the invention illustrated in FIG. 6, at operation 46, $2^N$ elements of each row of an array are loaded into the vector registers of a SIMD unit. Next, at operation 48, the $2^N$ elements of each row in the top half of the array are interleaved with the $2^N$ elements of a corresponding row in the bottom half of the array, so that each element from a row on the top half of the array precedes an element from a corresponding row in the bottom half of the array. Operations 46 and 48 are repeated N times. Finally, at operation 50, the results of the N loading and interleaving operations are written to a memory location in order, so the elements representing the top row of the rotated array precede the elements of each successive row of the rotated array.

Figure 7:
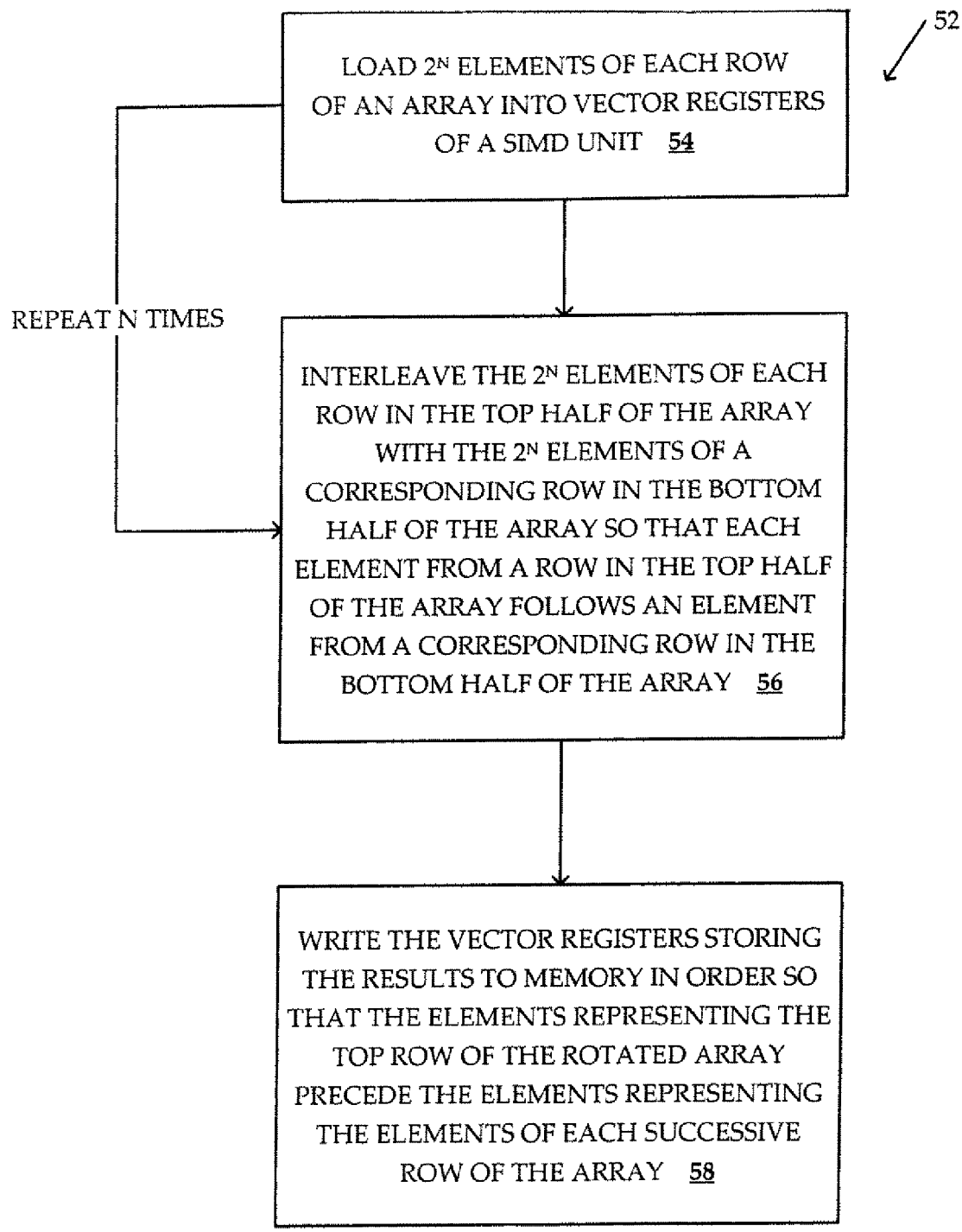
FIG. 7 illustrates a flowchart showing the operations, for one embodiment of the invention, required to rotate an array 90° in the clockwise direction; and, FIG. 8 illustrates an example of a conventional computer system 100 which may be used to implement the present invention.

FIG. 7 illustrates a flowchart showing the operations 52, for one embodiment of the invention, required to rotate an array 90° in the clockwise direction. According to the embodiment of the invention illustrated in FIG. 7, at operation 54, $2^N$ elements of each row of an array are loaded into the vector registers of a SIMD unit. Next, at operation 56, the $2^N$ elements of each row in the top half of the array are interleaved with the $2^N$ elements of a corresponding row in the bottom half of the array, so that each element from a row on the top half of the array precedes an element from a corresponding row in the bottom half of the array. Operations 54 and 54 are repeated N times. Finally, at operation 58, the results of the N loading and interleaving operations are written to a memory location in order, so the elements representing the top row of the rotated array precede the elements of each successive row of the rotated array.

Figure 8:
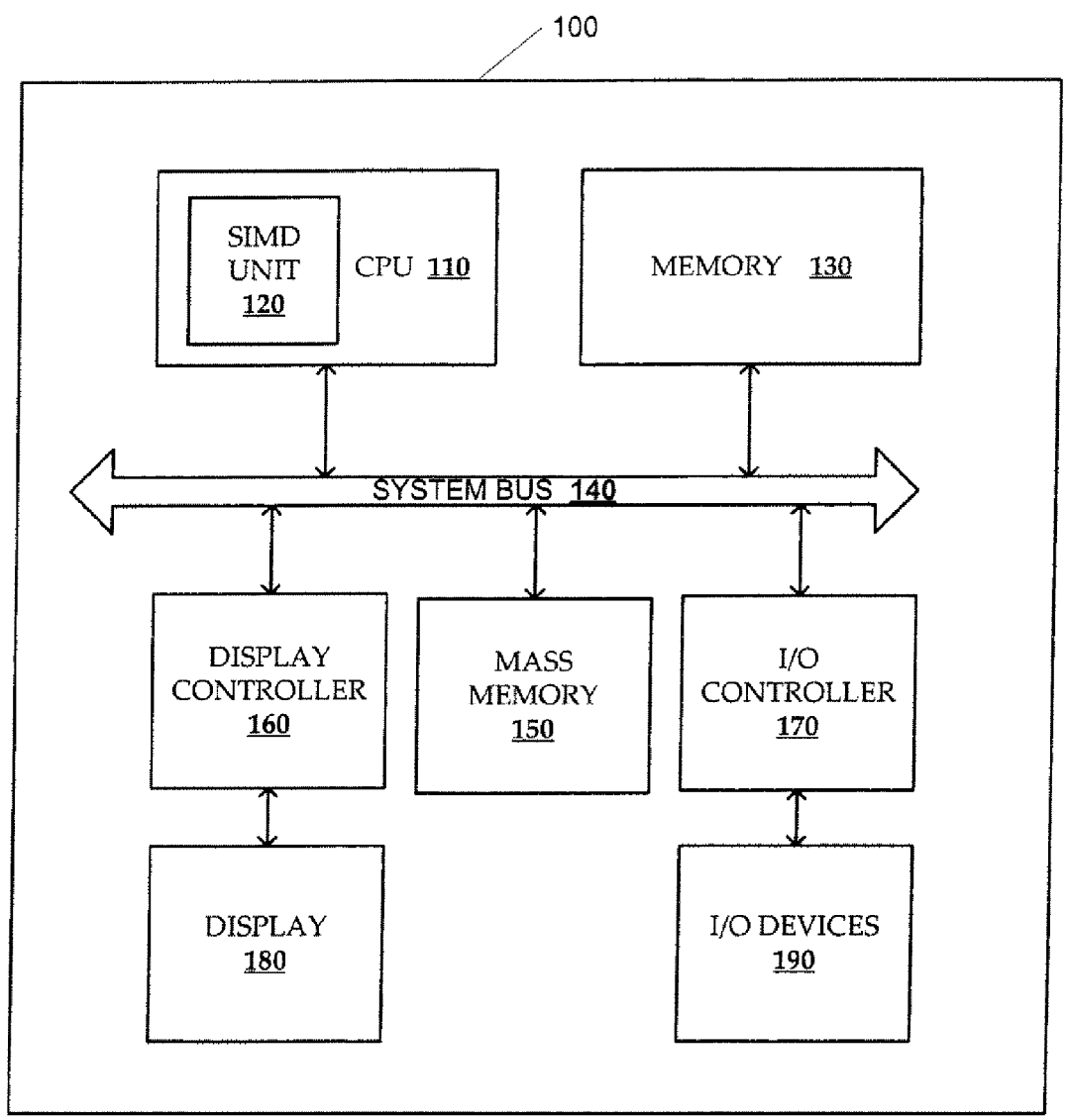

FIG. 8 illustrates an example of a conventional computer system 100 which may be used to implement the present invention. The computer system 100 includes a processor 110 which may be a conventional microprocessor (i.e., central processing unit (CPU)) such as a Motorola PowerPC microprocessor or an Intel Pentium microprocessor. The conventional processor 110 includes a SIMD unit 120 for processing multiple data in vector registers in response to the execution of a single instruction. Memory 130 is coupled to the processor 110 by the system bus 140. Memory 130 may be dynamic random access memory (DRAM) and may also include static RAM (SRAM). The system bus 140 couples the CPU 110 to the memory 130 and also to a mass memory module 150 and to display controller 160 and to the I/O (input output) controller 170. Display controller 160 controls, in a conventional manner, a display on the display device 180, which may be a CRT, liquid crystal display, or other display device. The I/O devices 190 may include: a keyboard, pointing device (e.g., a mouse), disk drives, printers, scanners, digital cameras, or other input or output devices. The display controller 160 and the I/O controller 170 may be implemented with conventional well-known technologies. The mass memory 450 may be a magnetic hard disk, an optical disk or other form of storage for large amounts of data. It will be appreciated that the computer system 100 is one example of many possible computer systems, which may have different architectures.

Thus, a method and system for rotating an array by 90° have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method to rotate a $2^N$ by $2^N$ array in the counter-clockwise direction, the computer-implemented method comprising:
   dividing the $2^N$ by $2^N$ array in half to separate rows in a top half of the $2^N$ by $2^N$ array from the rows in a bottom half of the $2^N$ by $2^N$ array;
   interleaving the $2^N$ elements of each row in the top half of the array with the $2^N$ elements of a corresponding row in the bottom half of the array so that each element from the top half of the array precedes an element from a corresponding row in the bottom half of the array; and
   repeating said loading and interleaving operations a total of N times.

2. The method of claim 1, wherein the interleaving operation includes storing the results of the interleaving operation in vector registers.

3. The computer-implemented method of claim 2, further comprising:
   after N loading and N interleaving operations, writing the vector registers storing the results of the N loading and N interleaving operations to memory in order so that the elements representing the top row of the rotated array precede the elements representing each successive row of the array, the last $2^N$ elements written to memory representing the bottom row of the rotated array.

4. The method of claim 1, wherein said interleaving the $2^N$ elements of each row in the top half of the array with the $2^N$ elements of a corresponding row in the bottom half of the array so that each element from the top half of the array precedes an element from a corresponding row in the bottom half of the array is performed in parallel.

5. The method of claim 1, wherein the loading and interleaving operations are achieved via the execution of a single vector merge instruction that operates on data in multiple vector registers.

6. The method of claim 1, wherein the $2^N$ by $2^N$ array represents a subsection of a digital image and the loading and interleaving operations are performed iteratively on a plurality of subsections to rotate an entire digital image.

7. A computer-implemented method to rotate a $2^N$ by $2^N$ array in the clockwise direction, the computer-implemented method comprising:
dividing the $2^N$ by $2^N$ array in half to separate rows in a top half of the $2^N$ by $2^N$ array from the rows in a bottom half of the $2^N$ by $2^N$ array;
interleaving the $2^N$ elements of each row in the top half of the array with the $2^N$ elements of a corresponding row in the bottom half of the array so that each element from the top half of the array follows an element from a corresponding row in the bottom half of the array; and
repeating said loading and said interleaving operations a total of N times.

8. The method of claim 7, wherein the interleaving operation includes storing the results of the interleaving operation in vector registers.

9. The computer-implemented method of claim 8, further comprising:
after N loading and N interleaving operations, writing the vector registers storing the results of the N loading and N interleaving operations to memory in order so that the elements representing the top row of the rotated array precede the elements representing each successive row of the array, the last $2^N$ elements written to memory representing the bottom row of the rotated array.

10. The method of claim 7, wherein said interleaving the $2^N$ elements of each row in the top half of the array with the $2^N$ elements of a corresponding row in the bottom half of the array so that each element from the top half of the array precedes an element from a corresponding row in the bottom half of the array is performed in parallel.

11. The method of claim 7, wherein the loading and interleaving operations are achieved via the execution of a single vector merge instruction that operates on data in multiple vector registers.

12. The method of claim 7, wherein the $2^N$ by $2^N$ array represents a subsection of a digital image and the loading and interleaving operations are performed iteratively on a plurality of subsections to rotate an entire digital image.

13. A computer-readable medium storing instructions, which, when executed, cause a computer to perform a method to rotate a $2^N$ by $2^N$ array in the counter-clockwise direction, the method comprising:
dividing the $2^N$ by $2^N$ array in half to separate rows in a top half of the $2^N$ by $2^N$ array from the rows in a bottom half of the $2^N$ by $2^N$ array;
interleaving the $2^N$ elements of each row in the top half of the array with the $2^N$ elements of a corresponding row in the bottom half of the array so that each element from the top half of the array precedes an element from a corresponding row in the bottom half of the array; and
repeating said loading and interleaving operations a total of N times.

14. A computer-readable medium as in claim 13, wherein said interleaving the $2^N$ elements of each row in the top half of the array with the $2^N$ elements of a corresponding row in the bottom half of the array so that each element from the top half of the array precedes an element from a corresponding row in the bottom half of the array includes storing the results of the interleaving operation in vector registers.

15. A computer-readable medium as in claim 14, wherein the method further comprises:
after N loading and N interleaving operations, writing the vector registers storing the results of the N loading and N interleaving operations to memory in order so that the elements representing the top row of the rotated array precede the elements representing each successive row of the array, the last $2^N$ elements written to memory representing the bottom row of the rotated array.

16. A computer-readable medium as in claim 13, wherein said interleaving the $2^N$ elements of each row in the top half of the array with the $2^N$ elements of a corresponding row in the bottom half of the array so that each element from the top half of the array precedes an element from a corresponding row in the bottom half of the array is performed in parallel.

17. A computer-readable medium as in claim 13, wherein the loading and interleaving operations are achieved via the execution of a single vector merge instruction that operates on data in multiple vector registers.

18. A computer-readable medium as in claim 13, wherein the $2^N$ by $2^N$ array represents a subsection of a digital image and said loading and interleaving operations are performed iteratively on a plurality of subsections to rotate an entire digital image.

19. A computer-readable medium storing instructions, which, when executed, cause a computer to perform a method to rotate a $2^N$ by $2^N$ array in the clockwise direction, the method comprising:
dividing the $2^N$ by $2^N$ array in half to separate rows in a top half of the $2^N$ by $2^N$ array from the rows in a bottom half of the $2^N$ by $2^N$ array;
interleaving the $2^N$ elements of each row in the top half of the array with the $2^N$ elements of a corresponding row in the bottom half of the array so that each element from the top half of the array follow an element from a corresponding row in the bottom half of the array; and
repeating said loading and interleaving operations a total of N times.

20. A computer-readable medium as in claim 19, wherein said interleaving the $2^N$ elements of each row in the top half of the array with the $2^N$ elements of a corresponding row in the bottom half of the array so that each element from the top half of the array precedes an element from a corresponding row in the bottom half of the array includes storing the results of the interleaving operation in vector registers.

21. A computer-readable medium as in claim 20, wherein the method further comprises:
after N loading and N interleaving operations, writing the vector registers storing the results of the N loading and N interleaving operations to memory in order so that the elements representing the top row of the rotated array precede the elements representing each successive row of the array, the last $2^N$ elements written to memory representing the bottom row of the rotated array.

22. A computer-readable medium as in claim 19, wherein said interleaving the $2^N$ elements of each row in the top half of the array with the $2^N$ elements of a corresponding row in the bottom half of the array so that each element from the top half of the array precedes an element from a corresponding row in the bottom half of the array is performed in parallel.

23. A computer-readable medium as in claim 19, wherein the loading and interleaving operations are achieved via the execution of a single vector merge instruction that operates on data in multiple vector registers.

24. A computer-readable medium as in claim 19, wherein the $2^N$ by $2^N$ array represents a subsection of a digital image and said loading and interleaving operations are performed iteratively on a plurality of subsections to rotate an entire digital image.

25. An apparatus for rotating a $2^N$ by $2^N$ array in the counter-clockwise direction, the apparatus comprising:
 a memory device to store the $2^N$ by $2^N$ array;
 a processor connected to the memory device, the processor including a SIMD unit having vector registers capable of storing and processing $2^N$ elements, wherein the processor is configured to divide the $2^N$ by $2^N$ array in half to separate rows in a top half of the $2^N$ by $2^N$ array from the rows in a bottom half of the $2^N$ by $2^N$ array;
 interleave the $2^N$ elements of each row in the top half of the array with the $2^N$ elements of a corresponding row in the bottom half of the array so that each element from the top half of the array precedes an element from a corresponding row in the bottom half of the array; and
 repeat said loading and interleaving operations a total of N times.

26. The apparatus of claim 25, wherein said processor is to store the results of each interleave operation in vector registers.

27. The apparatus of claim 26, wherein said processor is to:
 after the N load and N interleave operations, write the vector registers storing the results of the N load and N interleave operations to the memory device in order so that the elements representing the top row of the rotated array precede the elements representing each successive row of the rotated array, the last $2^N$ elements written to memory representing the bottom row of the rotated array.

28. The apparatus of claim 25, wherein said processor to interleave the $2^N$ elements of each row in the top half of the array with the $2^N$ elements of a corresponding row in the bottom half of the array so that each element from the top half of the array precedes an element from a corresponding row in the bottom half of the array, performs the interleave operation in parallel.

29. The apparatus of claim 25, wherein the SIMD unit of the processor performs the load and interleave operations in response to the execution of a single vector merge instruction.

30. The apparatus of claim 25, wherein the $2^N$ by $2^N$ array represents a subsection of a digital image stored in the memory device, and said processor is to rotate the entire digital image by iteratively rotating subsections of the digital image and writing the rotated subsections back to the memory device.

31. An apparatus for rotating a $2^N$ by $2^N$ array in the clockwise direction, the apparatus comprising:
 a memory device to store the $2^N$ by $2^N$ array;
 a processor connected to the memory device, the processor including a SIMD unit having vector registers capable of storing and processing $2^N$ elements, wherein the processor is to divide the $2^N$ by $2^N$ array in half to separate rows in a top half of the $2^N$ by $2^N$ array from the rows in a bottom half of the $2^N$ by $2^N$ array;
 interleave the $2^N$ elements of each row in the top half of the array with the $2^N$ elements of a corresponding row in the bottom half of the array so that each element from the top half of the array follows an element from a corresponding row in the bottom half of the array; and
 repeat said loading and interleaving operations a total of N times.

32. The apparatus of claim 31, wherein said processor is to store the results of each interleave operation in vector registers.

33. The apparatus of claim 32, wherein said processor is to:
 after the N load and N interleave operations, write the vector registers storing the results of the N load and N interleave operations to the memory device in order so that the elements representing the top row of the rotated array precede the elements representing each successive row of the rotated array, the last $2^N$ elements written to memory representing the bottom row of the rotated array.

34. The apparatus of claim 31, wherein said processor to interleave the $2^N$ elements of each row in the top half of the array with the $2^N$ elements of a corresponding row in the bottom half of the array so that each element from the top half of the array precedes an element from a corresponding row in the bottom half of the array, performs the interleave operation in parallel.

35. The apparatus of claim 31, wherein the SIMD unit of the processor performs the load and interleave operations in response to the execution of a single vector merge instruction.

36. The apparatus of claim 31, wherein the $2^N$ by $2^N$ array represents a subsection of a digital image stored in the memory device, and said processor is to rotate the entire digital image by iteratively rotating subsections of the digital image and writing the rotated subsections back to the memory device.

37. An apparatus for rotating a $2^N$ by $2^N$ array in the counter-clockwise direction, the apparatus comprising:
 storage means to store the $2^N$ by $2^N$ array;
 means to divide the $2^N$ by $2^N$ array in half to separate rows in a top half of the $2^N$ by $2^N$ array from the rows in a bottom half of the $2^N$ by $2^N$ array; means to interleave the $2^N$ elements of each row in the top half of the array with the $2^N$ elements of a corresponding row in the bottom half of the array so that each element from the top half of the array precedes an element from a corresponding row in the bottom half of the array; wherein said means to interleave is to iteratively perform an interleave operation a total of N times.

38. The apparatus of claim 37, wherein said means to interleave is to also to store the results of each interleave operation in a temporary storage means after an interleave operation.

39. The apparatus of claim 38, wherein said means to interleave is to:
 after N interleave operations, write the contents of said temporary storage means to said storage means to store the $2^N$ by $2^N$ array in order so that the elements representing the top row of the rotated array precede the elements representing each successive row of the array, the last $2^N$ elements written to said storage means representing the bottom row of the rotated array.

40. The apparatus of claim 37, wherein said means to interleave is to interleave the $2^N$ elements of each row in the top half of the array with the $2^N$ elements of a corresponding row in the bottom half of the array so that each element from the top half of the array precedes an element from a corresponding row in the bottom half of the array, wherein said interleave operation is performed in parallel.

41. The apparatus of claim 37, wherein the $2^N$ by $2^N$ array represents a subsection of a digital image stored in said storage means, and said means to interleave is to rotate the entire digital image by iteratively rotating subsections of the digital image and writing the rotated subsections back to said storage means.

42. An apparatus for rotating a $2^N$ by $2^N$ array in the clockwise direction, the apparatus comprising:
    storage means to store the $2^N$ by $2^N$ array;
    means to divide the $2^N$ by $2^N$ array in half to separate rows in a top half of the $2^N$ by $2^N$ array from the rows in a bottom half of the $2^N$ by $2^N$ array; means to interleave the $2^N$ elements of each row in the top half of the array with the $2^N$ elements of a corresponding row in the bottom half of the array so that each element from the top half of the array follows an element from a corresponding row in the bottom half of the array; wherein said means to interleave is to iteratively perform an interleave operation a total of N times.

43. The apparatus of claim 42, wherein said means to interleave is to also to store the results of each interleave operation in a temporary storage means after an interleave operation.

44. The apparatus of claim 43, wherein said means to interleave is to:
    after N interleave operations, write the contents of said temporary storage means to said storage means to store the $2^N$ by $2^N$ array in order so that the elements representing the top row of the rotated array precede the elements representing each successive row of the array, the last $2^N$ elements written to said storage means representing the bottom row of the rotated array.

45. The apparatus of claim 42, wherein said means to interleave is to interleave the $2^N$ elements of each row in the top half of the array with the $2^N$ elements of a corresponding row in the bottom half of the array so that each element from the top half of the array precedes an element from a corresponding row in the bottom half of the array, wherein said interleave operation is performed in parallel.

46. The apparatus of claim 42, wherein the $2^N$ by $2^N$ array represents a subsection of a digital image stored in said storage means, and said means to interleave is to rotate the entire digital image by iteratively rotating subsections of the digital image and writing the rotated subsections back to said storage means.

* * * * *

UNITED STATES PATENT AND TRADEMARK OFFICE
CERTIFICATE OF CORRECTION

PATENT NO. : 7,768,531 B2
APPLICATION NO. : 12/414634
DATED : August 3, 2010
INVENTOR(S) : Ian R. Ollmann It is certified that error appears in the above-identified patent and that said Letters Patent is hereby corrected as shown below:

In column 2, line 2, delete "operations" and insert -- operation, --, therefor.

In column 4, line 33, delete "Finally" and insert -- Finally, --, therefor.

In column 5, line 4, delete "counterclockwise" and insert -- counter-clockwise --, therefor.

In column 5, line 12, delete "$2^N$" and insert -- $2^{2N}$ --, therefor.

In column 5, line 16, delete "FIG. 31" and insert -- FIG. 3, --, therefor.

In column 5, line 20, delete "counterclockwise" and insert -- counter-clockwise --, therefor.

In column 6, line 8, delete "memory" and insert -- memory, --, therefor.

In column 6, line 54, delete ""VIN3"," and insert -- "VIN3," --, therefor.

In column 7, line 22, delete "array" and insert -- array, --, therefor.

In column 8, line 14, delete "(input output)" and insert -- (input/output) --, therefor.

In column 8, line 22, delete "450" and insert -- 150 --, therefor.

In column 8, line 23, delete "disk" and insert -- disk, --, therefor.

Signed and Sealed this
Fifteenth Day of November, 2011

David J. Kappos
*Director of the United States Patent and Trademark Office*